Figure 1:
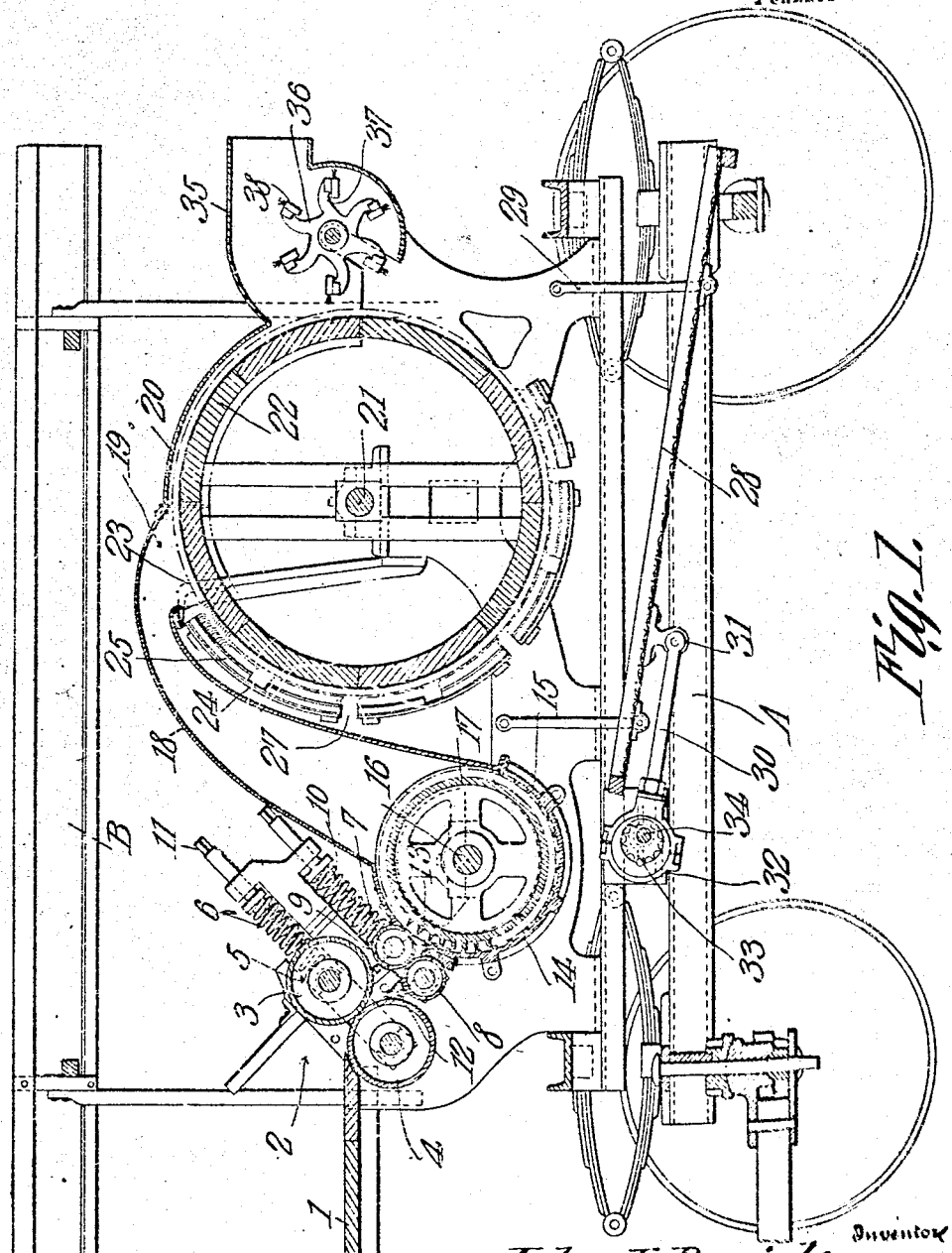

J. L. DANIELS & B. G. KUHNE.
MACHINE FOR STRIPPING AND BREAKING COTTON STALKS.
APPLICATION FILED DEC. 7, 1908.

986,551. Patented Mar. 14, 1911.

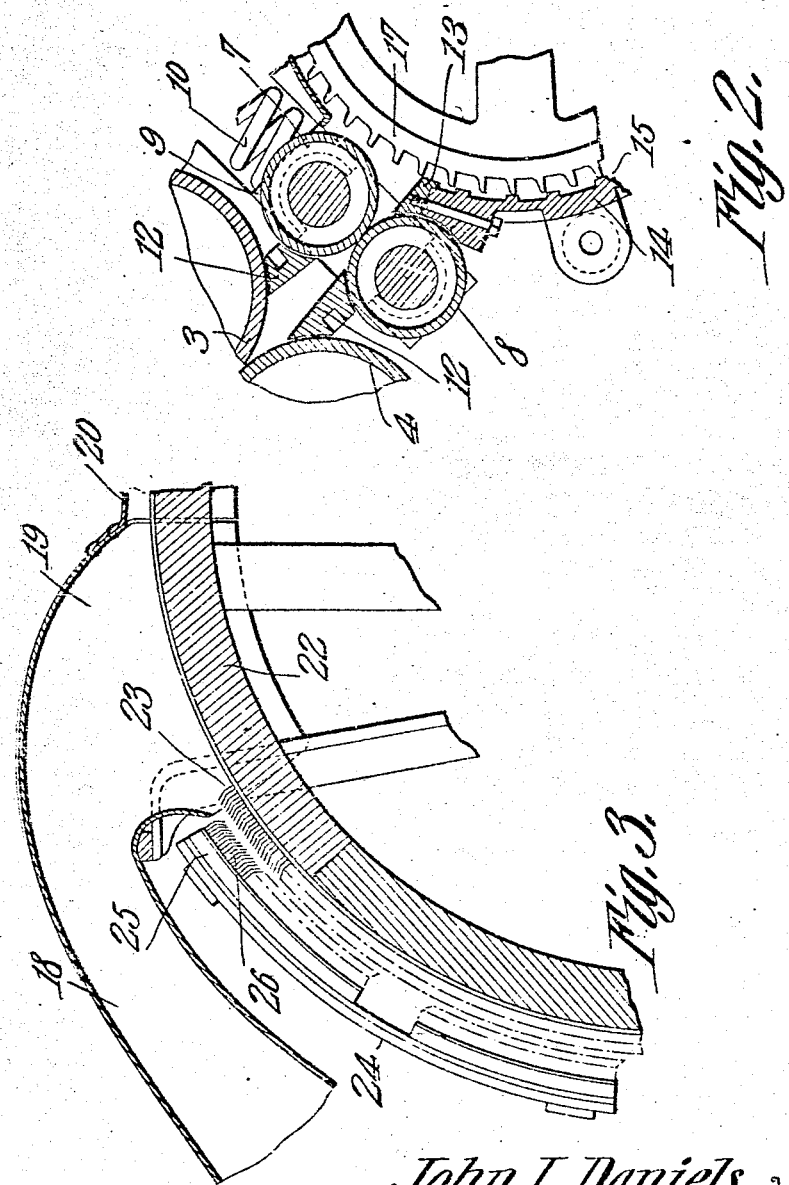

UNITED STATES PATENT OFFICE.

JOHN LOUIS DANIELS AND BERNHARD G. KUHNE, OF CHARLOTTE, NORTH CAROLINA, ASSIGNORS TO COTTON STALK FIBER MACHINE COMPANY, OF GAFFNEY, SOUTH CAROLINA.

MACHINE FOR STRIPPING AND BREAKING COTTON-STALKS.

986,551.     Specification of Letters Patent.     Patented Mar. 14, 1911.

Application filed December 7, 1908. Serial No. 466,379.

*To all whom it may concern:*

Be it known that we, JOHN LOUIS DANIELS and BERNHARD G. KUHNE, citizens of the United States, residing at Charlotte, in the county of Mecklenburg and State of North Carolina, have invented a new and useful Machine for Stripping and Breaking Cotton-Stalks, of which the following is a specification.

This invention relates to machines for stripping and breaking cotton stalks to produce bark fiber capable of use as a substitute for excelsior, curled hair, jute, etc., in packing, upholstering, and spinning, and to reduce the wooden body of the stalks to a comminuted state whereby said wood can be used in the production of paper.

Heretofore paper has been manufactured out of cotton stalks but it has been possible to obtain only an inferior grade because it has been customary to reduce the bark as well as the body of the stalks to a pulp, and as a result the bark has discolored the paper.

The object of the present invention is to strip the bark from the stalks so that the pulp produced will not be discolored in the manner stated and a product, to wit: bark fiber, is obtained which can be used for the purposes stated.

Another object is to provide a machine for producing these products and which is capable of being taken into the field where the stalks are stacked and where it can be operated to strip and break the stalks and to grade the products.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a longitudinal section through the machine; Fig. 2 is an enlarged section through the feed and crushing mechanism of the machine; Fig. 3 is an enlarged section through a portion of the separating cylinder and the adjoining bars used in connection therewith.

Referring to the figures by characters of reference A designates the frame of a wheel-supported vehicle designed to be drawn from place to place and this frame preferably has a cover B supported thereupon so so as to protect the machine from rain, etc.

The mechanism constituting the present invention includes a feed table 1, suitably supported adjacent a hopper 2, so located as to direct material into the pass between crushing rolls 3 and 4. One of these rolls is journaled within slidable boxes 5 which are spring-pressed as shown at 6, so that a constant pressure is exerted by the rolls upon the material fed thereto. Located below the crusher rolls 3 and 4 are feed rolls 7 and 8, the roll 7 being mounted within slidable boxes 9 pressed by springs 10 similar to the springs 6 heretofore referred to. Screws 11 may be utilized for increasing and diminishing the stress of these springs. Spacing blocks 12 are interposed between the rolls 3 and 7 and 4 and 8 and form a passage therebetween through which material is free to travel from the pass between rolls 3 and 4 to the pass between the feed rolls 7 and 8. A detachable breaker plate 13 is arranged directly below the pass between rolls 7 and 8 and at the upper feed end of a concave 14. This concave is provided with teeth 15 and disposed above and concentric with the concave is a shaft 16 on which is mounted a shredding cylinder 17 also provided with teeth. A flue 18 houses the upper portion of the cylinder 17 and is curved upwardly therefrom and is provided at its upper end with a downward discharge 19 opening into the upper portion of a casing 20. A shaft 21 is mounted to rotate within this casing and below the outlet 19 and mounted on said shaft is a separating cylinder 22 covered with card clothing 23 arranged with the dip of wire in the direction of rotation of the cylinder. Brackets or other suitable supporting devices 24 are arranged below the flue 18 and outlet 19 and support pairs of bars 25 which extend throughout the length of the separating cylinder and are covered with a strip of card clothing 26, the wires of which point in the direction of travel of the material. This arrangement of the wires has been plainly indicated in Fig. 3 of the drawings. Any desired number of bars 25 may be utilized and said bars are spaced apart so as to leave openings 27 through which the particles of wood may fall.

A screen 28 is supported below the bars 25 by means of oscillating hangers 29, said screen being preferably inclined and designed to be driven in any preferred manner as by means of a rod 30 pivotally connected thereto as at 31 and provided at one end with an eccentric strap 32 surrounding and receiving motion from an adjustable eccentric 33 carried by a shaft 34.

A blow spout 35 extends from the casing 20 within which the cylinder 22 is located and revolubly mounted within this spout is a take-off brush 36 designed to remove accumulations from the cylinder 22. This brush may be of any construction but preferably consists of a series of radial spokes 37 carrying bars 38, from which the brush bristles extend. It is of course to be understood that any suitable mechanism may be utilized for driving the various parts of the machine at the desired speed.

In using the machine herein described the stalks are placed upon the feed table 1 and pass into the hopper 2 by which they are directed between the rolls 3 and 4. These rolls flatten the stalks so as to render them of uniform thickness, after which they are discharged between the feed rolls 7 and 8. During this last operation the wood of the flattened stalks is further broken and crushed without however injuring the fibrous bark. The feed rolls then direct the material over the breaker plate 13 whereupon the rotating shredding cylinder 17 engages the material and not only breaks the wood but splits the bark fiber and pulls it therefrom. This cylinder rotates very rapidly and carries the material over the concave 14 and forces it through the flue 18 where it is engaged by the carding or separating cylinder 22 and carried over the carding cloth 26 on bars 25. At this point in the operation the bark fiber is thoroughly separated from the broken wood and the particles of wood drop between the bars 25 and on to the screen 28 which reciprocates to sift the dirt and dust from the wood while the said wood particles are discharged as tailings from the end of the screen. Worthless pieces of bark fiber also pass downward through the bars and screen. The desirable fibers however are carried by the card clothing of the cylinder 22 upward to the spout 35 where the brush 57 operates to strip them from the cylinder and discharge them through the spout.

It will be seen that by utilizing the machine here described two products are obtained from cotton stalks. The first of these products, to wit: the bark fiber, constitutes an efficient substitute for curled hair and excelsior and can be used in upholstering or for packing purposes. The fiber can also be employed as a substitu for jute in spinning. The wood particles which are produced form an excellent material for the production of paper pulp, and by stripping the bark from the wood in the manner described a paper of very good quality can be produced from the wood.

What is claimed is:—

1. The combination with a revoluble carding cylinder and fixed carding devices coöperating therewith; of a flue for directing material between the fixed and revoluble carding devices, a toothed concave, and a shredding cylinder revolubly mounted adjacent and coöperating with the concave, said cylinder constituting means for directing material into the flue.

2. A machine of the class described including a revoluble carding device, spaced fixed carding devices coöperating therewith, each of said carding devices having card clothing thereon with the points of the wires bent in the direction of rotation of the revoluble carding device, a shredding cylinder, a concave coöperating therewith, feed rolls adjacent the shredding cylinder, a breaker plate interposed between the feed rolls and concave and coöperating with the shredding cylinder, said plate being arranged to receive material from the feed rolls, and means for directing material from the concave to the carding devices.

3. The combination with a table; of crusher rolls for receiving material therefrom, feed rolls for receiving material from the crusher rolls, a breaker plate for receiving material from the feed rolls, fixed and revoluble shredding devices for receiving material from the breaker plate, coöperating fixed and revoluble carding devices, means for directing material from the shredding devices to the carding devices, said fixed carding devices being spaced apart, a screen for receiving and grading material discharged between the fixed carding devices, and means for removing material from the movable carding device.

4. The combination with shredding means, of a revoluble carding device for engaging material discharged from said shredding means, spaced fixed carding devices coöperating with said revoluble device, means for supplying material to said shredding means, said supplying means including crushing members, and means for conducting material from the shredding means to the carding devices.

5. The combination with a revoluble carding device, of spaced fixed carding devices coöperating with said revoluble carding device and having outlets there-between, crushing means, a breaker blade, feeding means interposed between the breaker blade and the crushing means for directing material from the crushing means to the breaker blade, a shredding cylinder coöperating with the breaker blade, a concave cooperating with said cylinder, and means for conducting material from the shredding cylinder and its concave to the carding devices.

6. The combination with a revoluble carding device, and spaced fixed carding devices coöperating therewith, of a shredding cylinder, a concave coöperating therewith, a breaker plate removably mounted at the free end of the concave, means for feeding material across the breaker plate to the shredding cylinder, and a flue for conveying material from said concave to the carding devices.

7. A machine of the class described comprising a revoluble carding device, spaced stationary carding devices coöperating therewith and having outlets therebetween, a revoluble shredding cylinder, a concave coöperating therewith, a breaker plate detachably mounted at the feed end of said concave, crushing rolls, means for feeding material from said rolls and across the breaker plate to the concave, a flue for directing material from said concave and cylinder to the carding devices, and revoluble means for removing material from the clothing of the revoluble carding device.

8. In a machine of the class described, a revoluble carding device, spaced stationary carding devices coöperating therewith and having outlets therebetween, coöperating revoluble and stationary shredding elements, a removable breaker plate adjacent thereto, crushing devices, means for feeding material from the crushing devices to the breaker plate, and means for conveying material from the shredding elements to the carding devices, and a reciprocating separator for receiving material from the outlets between the stationary carding devices.

In testimony that we claim the foregoing as our own, we have hereto affixed our signatures in the presence of two witnesses.

JOHN LOUIS DANIELS.
BERNHARD G. KUHNE.

Witnesses:
  GEORGE H. NOBLE,
  F. K. GARDNER.